United States Patent
Inciong

(10) Patent No.: US 6,536,775 B1
(45) Date of Patent: Mar. 25, 2003

(54) BOUNDARY GASKET WITH INTEGRAL BOLT THREAD SEALS

(75) Inventor: Josefino Tibayan Inciong, Skokie, IL (US)

(73) Assignee: Dana Corporation, Toledo, OH (US)

( * ) Notice: Subject to any disclaimer, the term of this patent is extended or adjusted under 35 U.S.C. 154(b) by 51 days.

(21) Appl. No.: 09/772,575

(22) Filed: Jan. 30, 2001

(51) Int. Cl.[7] ................................................. F16J 15/02
(52) U.S. Cl. ...................... 277/596; 277/598; 277/609; 277/612; 277/637; 277/749; 411/371.1
(58) Field of Search ................................ 277/593, 596, 277/598, 608, 609, 611, 612, 615, 637, 639, 648, 649, 567; 411/371.1, 542

(56) References Cited

U.S. PATENT DOCUMENTS

| | | | |
|---|---|---|---|
| 3,282,596 A | * | 11/1966 | Wood et al. |
| 3,726,178 A | * | 4/1973 | Dimitry |
| 3,936,059 A | | 2/1976 | Gordon |
| 4,535,996 A | | 8/1985 | Cardis et al. |
| 4,691,928 A | * | 9/1987 | Abele |
| 5,295,698 A | | 3/1994 | Agarwal et al. |
| 5,662,337 A | | 9/1997 | Surbrook et al. |
| 5,700,017 A | | 12/1997 | Tensor |
| 6,173,969 B1 | * | 1/2001 | Stoll et al. |

* cited by examiner

Primary Examiner—Anthony Knight
Assistant Examiner—E Peavey
(74) Attorney, Agent, or Firm—Rader, Fishman & Grauer PLLC

(57) ABSTRACT

A unitary boundary gasket is adapted for sealing between flanged portions of two axially mated surfaces of rigid metallic members, such as between the bottom of an engine block and an associated engine oil pan. In one preferred form, the gasket has a rectilinearly shaped annular body, and is formed of a one-piece radially outermost rigid metallic carrier having a first axial thickness, and adhesively bonded to a one-piece radially innermost elastomeric sealing body. The sealing body is bonded to the metallic carrier at the radially innermost edge of the carrier. The sealing body includes a plurality of spaced elastomeric apertures adapted for accommodating passage of bolt members for fastening said flanged portions together about the gasket body. The apertures are designed for sealing against leakage of fluids between said apertures and said bolt members. For this purpose, each aperture includes at least two axially spaced integral sealing lips.

12 Claims, 2 Drawing Sheets

BOUNDARY GASKET WITH INTEGRAL BOLT THREAD SEALS

BACKGROUND OF THE INVENTION

1. Field of Invention

The present invention relates to improved bolted-on automotive gasket assemblies for internal combustion engines, and more particularly to improved gaskets applied between the bottom flange portions of such engines and the oil pan structures secured thereto.

2. Description of the Prior Art

Those skilled in the art will appreciate the difficulty of maintaining a good quality oil seal between the bottom flange of an internal combustion engine and the oil pan secured to the flange. Typically, the pan is secured to a flange which has portions in various planes, some of the portions including semi-cylindrical sealing surfaces, such as, for example, the portion situated at the centrally located rear main bearing cap of the typical vehicle. Indeed, most oil pan covers have two generally longitudinally extending flat flange surfaces which mate with engine mounting flanges, and two generally semi-circular recessed ends adapted to accommodate the bearing cap and the timing chamber cover, respectively. Thus, the overall environment for sealing oil pan structures is difficult at best.

Unitary prior art molded rubber gaskets have been employed to seal such described irregular boundary sealing criteria. However, such gaskets generally have main body portions defining bolt or fastener apertures and include concave ends for sealing the noted semi-circular recessed ends. Such gaskets are also difficult to install to the extent that they are limp; i.e. without stiffness. Such gaskets are also prone to splitting problems at the fastener holes.

As a result, traditional gaskets employed to seal such areas have been subject to considerable redesign efforts in recent years, particularly for aftermarket replacements. One replacement application is directed to identifying a suitable substitution for an original equipment gasket consisting of a cork material. Gasket materials suggested as replacements have included thermoset or thermoplastic elastomers, or possibly even soft plastic resins, such as unfilled nylon. In any event, the seal must be robust enough to avoid premature deterioration, and must be resilient enough to seal areas that may be quite narrow. In addition, upon premature failure of the main seal, some attention is needed to provide a backup seal in or around the bolthole apertures of the gasket, a recognized source of potential secondary leakage.

SUMMARY OF THE INVENTION

The present invention is an improved boundary gasket for sealing between flanged portions of axially mated rigid surfaces. A unitary molded rubber gasket incorporates a rigid metallic carrier, and is thus adapted for sealing between flanged portions between the bottom of an engine block and an associated engine oil pan secured thereto. In one preferred form, the gasket has a generally rectilinearly shaped body, and includes a one-piece circumferentially extending rigid metallic carrier having a first axial thickness. The carrier, which acts as a bolt crush limiter, is adhesively bonded to a one-piece elastomeric sealing body; the sealing body is bonded to the metallic carrier at the radially innermost edge of the carrier. The carrier thus also imparts stiffness to the sealing body, which includes a plurality of spaced elastomeric apertures adapted for accommodating passage of bolt members for fastening the flanged portions of engine and oil pan together about the gasket body. The apertures are designed for sealing against secondary leakage of fluids (e.g., oil) between said apertures and said bolt members.

For this purpose, each aperture includes at least two axially spaced integral sealing lips, the lips extending radially inwardly from the aperture wall for sealingly engaging an associated bolt member. The elastomeric sealing body further includes a unitary sealing bead integral with, and extending circumferentially about, said sealing body, the bead positioned radially outwardly of the spaced apertures for providing a primary sealing function. The bead has a second axial thickness greater than the first; thus upon the tightening of the bolt members the elastomeric material of the bead will only be crushed or compressed to the limiting axial thickness of the carrier.

Finally, the same preferred embodiment of the gasket has two longitudinally extending, flat, side portions, with arcuate end portions contiguously joining the side portions for accommodating semi-circular members situated immediately adjacent the oil pan.

DETAILED DESCRIPTION OF THE PREFERRED EMBODIMENTS

Figure 1:
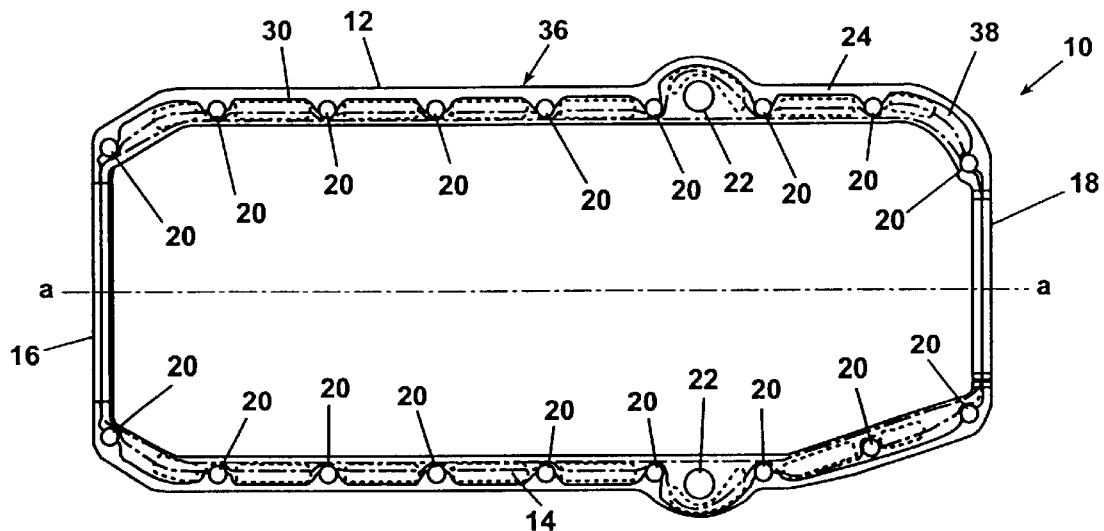
FIG. 1 is a plan view of one preferred embodiment of the boundary gasket that incorporates a plurality of integral bolt seals of the present invention.
Figure 3:
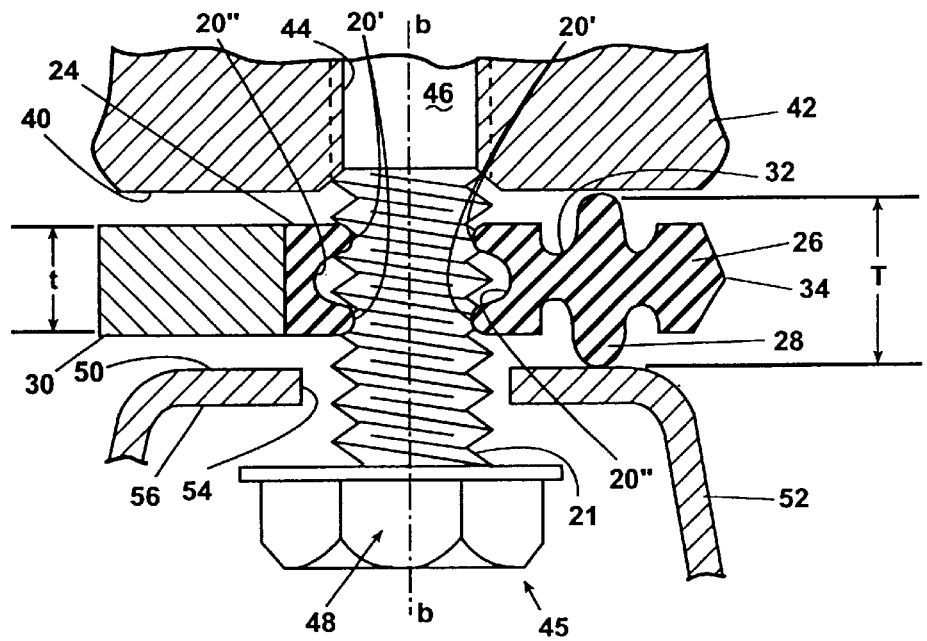
FIG. 3 is a cross-sectional view of a fragmentary portion of the boundary gasket of the same preferred embodiment, depicting a view of one bolt extending through one of the integral bolt seals, after the gasket has been secured in place between the flanged structures.

Referring initially to FIG. 1, a preferred embodiment of an oil pan boundary gasket 10 has an axis "a—a" which runs parallel to the axis of an associated vehicle, and includes two longitudinally extending flat sides 12 and 14, representing left and right vehicular engine sides, respectively. The flat sides 12 and 14 run generally parallel to the axis but in different planes, and are bounded by arcuate ends 16 and 18 which join the sides 12 and 14 together contiguously to form the generally rectilinearly shaped gasket 10. A plurality of spaced apertures 20 is disposed about the rectilinear gasket body. The apertures 20 are adapted to accommodate bolt members 45 (as shown in FIG. 3) for securement of the gasket 10, as will be further explained herein. Those skilled in the art will appreciate that single right and left side apertures 22 are provided for accommodating either left or right side engine oil dip stick (not shown).

Figure 2:
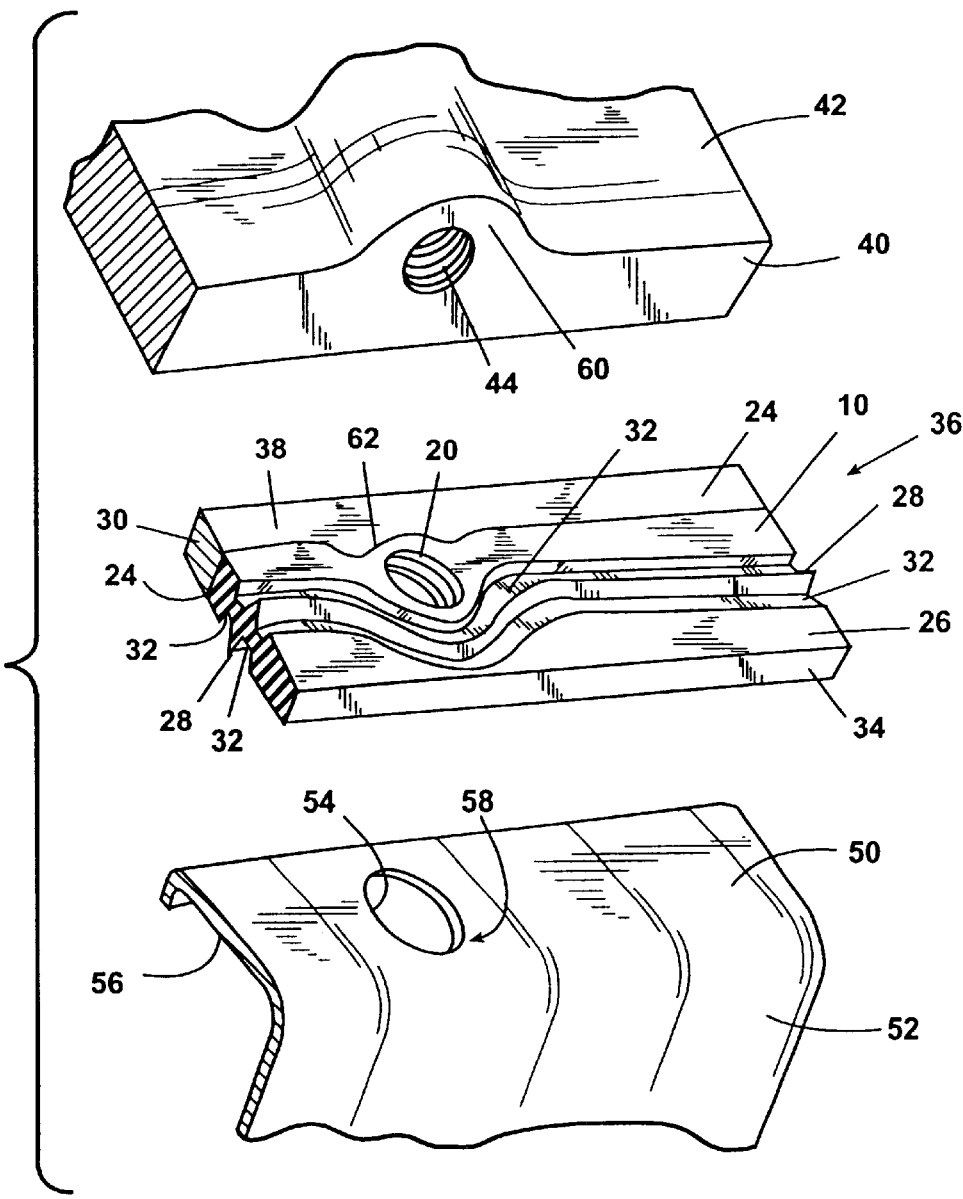
FIG. 2 is an exploded fragmentary perspective, as well as a cross-sectional, view of the boundary gasket depicting the gasket interposed between an internal combustion engine flange and a mating flange of an oil pan prior to securement together of the flanged structures by bolts.

Referring now to FIGS. 1 and 2, the rectilinearly shaped body of the gasket 10 includes a one-piece rigid carrier 30, preferably formed of metal such as stamped steel, to act as a stiffening agent for the gasket body as well as a bolt crush limiter, as will be further explained. For these purposes, the carrier 30 extends circumferentially about the radially outermost edge of the gasket 10. Adhesively bonded to the radially innermost edge 24 of the carrier 30 is an elastomeric sealing body 26 containing the noted apertures, including the plurality of apertures 20. Proximal to the radially innermost edge 34 of the sealing body 26, a unitary sealing bead 28 extends about the entire circumference of the gasket 10.

An inset portion 36 (FIG. 1) of the gasket 10 is framed along the longitudinally extending left hand engine side 12 of the gasket. Referring now specifically to FIG. 2, the inset portion 36 is shown as fragmentary portion of the gasket 10 that includes just one of the plurality of apertures 20, wherein the exploded view depicts the relative position of the fragmentary portion 36 between complementary mating fragmentary portions of the engine block 42 and the oil pan flange 50 of the oil pan 52. Referring now also to FIG. 3, the engine block 42 contains a threaded aperture 44, and the oil pan flange 50 includes an aperture 54. Thus, the preferably relatively smaller aperture 20 (of portion 36) is adjusted to register with apertures 44 and 54 to enable admission of a threaded shank 46 of the bolt member 45 for securement of the oil pan 52 and gasket 10 to the metallic mating flange 40 of the engine block 42.

In its preferred form, the unitary sealing bead 28 is bordered on both sides by thin-walled connective annuli 32 integrally molded into and thus part of the elastomeric sealing body 26. Visible in both upper and lower surfaces 38 and 39 of the gasket 10 (FIG. 2), the annuli 32, which border each radially disposed side of the convex bead 28, appear as surface concavities. Each annulus is disposed to act as a relief zone to accommodate displacement of the bead 28, because though elastic, the elastomeric material of the bead 28 is virtually incompressible. The elastomeric bead 28 will therefore be deformed radially inwardly as well as outwardly upon application of compressive forces created by the tightening of the bolt member 45.

Continuing reference to both FIGS. 2 and 3, it will be appreciated that the underside 56 of the oil pan 52 will be engaged by a bolt head 48 of the bolt member 45 upon the securement of the pan 52 and the gasket 10 to the engine block 42. Referring specifically to FIG. 2, a radially innermost portion 58 of the oil pan flange 50 defines a very narrow sealing width adjacent the aperture 54 for accommodating the sealing bead 28 of the gasket 10. Correspondingly, the engine block flange 40 also offers a very narrow available sealing area 60. Those skilled in the art will appreciate that primary sealing becomes a challenge whenever available sealing area is small, and thus restricted. Thus this invention contemplates that a backup sealing feature is provided within each gasket aperture 20.

Referring now specifically to FIG. 3, each elastomeric bolt aperture 20 is molded to integrally incorporate a C-shaped cross-section defining two (dual) annular sealing lips 20', spaced apart along longitudinal axis "b—b" of the threaded bolt shank 46. Moreover, in the preferred form of the present invention, each of such dual sealing lips 20'extends radially inwardly from the aperture wall 20" for sealingly engaging the shank 46. In addition, the sealing lips are sized to create an interference fit with, and to resiliently engage, the interstices 21 of each threaded bolt shank 46 disposed therethrough. The dual sealing lips 20', preferably situated at the axial extremities of the C-shaped cross-section of each aperture, as shown, provide a double seal in each of the plurality of apertures 20, and thus afford a reliable backup sealing medium for the sealing bead 28 of the gasket 10.

Continuing reference to FIG. 3, it will noted that the rigid carrier 30 has a thickness "t" less than the thickness "T" of the uncompressed sealing bead 28. The carrier 30 thus acts as a crush limiter to avoid over-torquing of the bolt members 45, with the commensurate undesirable result of crushing of the bead 28 beyond its elastic limits. In order to facilitate this function, the carrier 30 includes a series of undulations 62 that extend the metal body of the carrier into areas immediately adjacent each of the boltholes 20. In fact, the undulations 62 extend into the areas immediately underlying each bolt head 48 to assure that the crush limiting function is particularly effective at each of the plurality of bolt members 45 about the gasket 10.

Finally, the apertures 20 of the preferred embodiment of the gasket 10 of this invention are suitably sized for actually retaining bolt members 45 prior to assembly and installation of the gasket. Thus the elastomeric C-shaped concave cross-sections 20" with their associated sealing lips 20' are adapted to resiliently engage the threaded shanks 46 of the members 45. This feature not only facilitates installation of the gasket 10, but also aids in alignment of the gasket to the engine block flange 40 during assembly or overhaul, as will be appreciated by those skilled in the art.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A unitary boundary gasket adapted for sealing between flanged portions of two axially mated surfaces of rigid metallic members, said flanged portions each containing a plurality of spaced bolt apertures; said gasket comprising:
   a) a one-piece radially outermost rigid metallic carrier having a first axial thickness,
   b) a one-piece radially innermost elastomeric sealing body bonded to said metallic carrier at the radially innermost edge of said carrier,
   c) said sealing body comprising a plurality of spaced elastomeric apertures adapted for mating registration with apertures of said flanged portions, said elastomeric apertures adapted for accommodating passage of bolt members for fastening said flanged portions together about said gasket, said apertures further adapted for sealing against leakage of fluids between said apertures and said bolt members, wherein said elastomeric apertures comprise at least two spaced integral elastomeric sealing lips, said lips extending radially inwardly from the aperture wall for sealingly engaging a bolt member,
   d) said elastomeric sealing body further comprising a unitary sealing bead extending circumferentially about the gasket, radially outwardly of said spaced apertures, said bead having a second axial thickness greater than said first.

2. The unitary boundary gasket of claim 1 further comprising two longitudinally extending flat side portions, and arcuate end portions contiguously joining said side portions.

3. The unitary boundary gasket of claim 2 wherein said longitudinally extending flat side portions are in different planes.

4. A The unitary boundary gasket of claim 1 wherein at least one of said elastomeric apertures contains one of a plurality of bolt members disposed therein.

5. The unitary boundary gasket of claim 4 wherein each of said elastomeric apertures comprises a C-shaped cross-section defining said sealing lips at the axial extremities of said cross-section.

6. The unitary boundary gasket of claim 5 wherein said elastomeric sealing lips have diameters less than diameters of said bolt members, and wherein said sealing lips define apertures having radii smaller than the radii of said bolt apertures in either of said flanged portions of said metallic members.

7. The unitary boundary gasket of claim 6 wherein said sealing lips are adapted to extend into the threaded interstices of said bolt members to create an interference fit therewith.

8. The unitary boundary gasket of claim 4 wherein each of said bolt members has a head and a threaded shank, and wherein said radially innermost edge of said carrier comprises undulations which define crush limiter portions of said carrier; wherein said crush limiter portions of said undulations are proximal to each aperture and adapted to underlie a head of a bolt member upon securement of said gasket between said mated surfaces.

9. The unitary boundary gasket of claim 1 wherein said elastomeric unitary sealing bead comprises axially upper and axially lower portions, said bead circumferentially surrounded on both sides by thin-walled portions defining surface concavities for stress relief immediately adjacent the bead on both upper and lower surfaces of said gasket.

10. The unitary boundary gasket of claim 1 wherein said metallic carrier is a stiffening member for said gasket.

11. The unitary boundary gasket of claim 10 wherein said metallic carrier is formed of stamped steel.

12. The unitary boundary gasket of claim 1 wherein said spaced elastomeric apertures are positioned between said innermost edge of said rigid metallic carrier and said elastomeric unitary sealing bead.

* * * * *